June 11, 1968
J. L. BROOKS
3,388,326
NETWORK FOR DETERMINING MAGNITUDE AND PHASE
ANGLE OF NOISE IMPEDANCE
Filed July 29, 1964
3 Sheets-Sheet 1
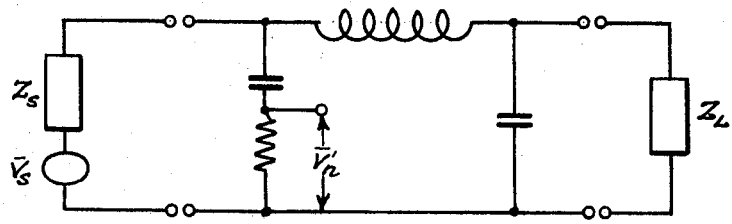
FIG. 1.   PRIOR ART LISN
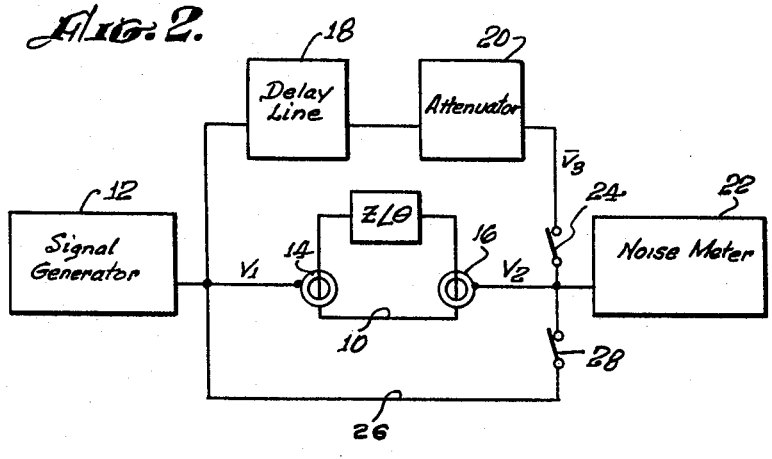
FIG. 2.
JAMES L. BROOKS,
INVENTOR.
BY *Erwin A. Johnston*
ATTORNEY.

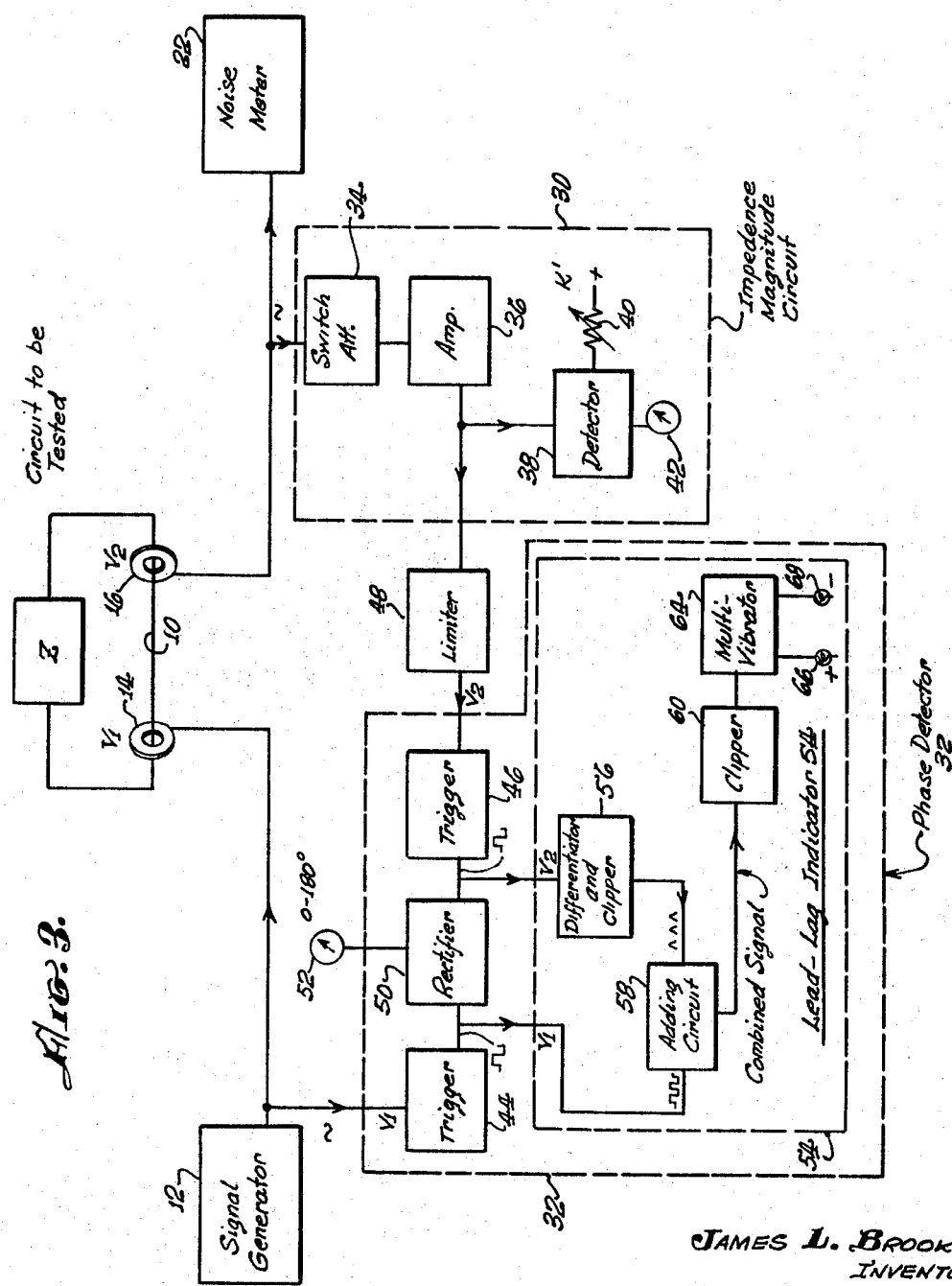

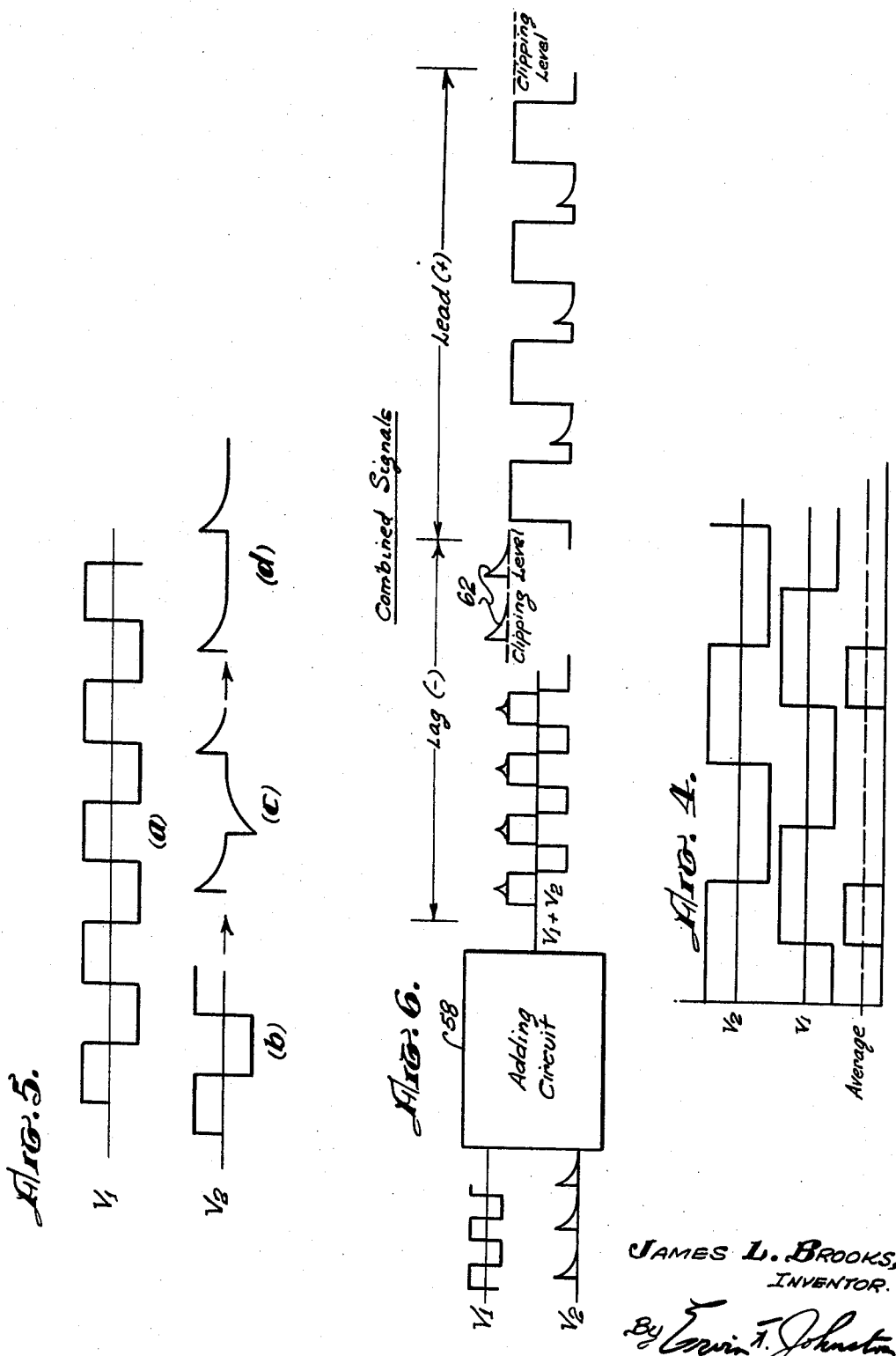

United States Patent Office 3,388,326
Patented June 11, 1968

3,388,326
NETWORK FOR DETERMINING MAGNITUDE
AND PHASE ANGLE OF NOISE IMPEDANCE
James L. Brooks, Oxnard, Calif., assignor to the United
States of America as represented by the Secretary of
the Navy
Filed July 29, 1964, Ser. No. 386,095
2 Claims. (Cl. 324—57)

ABSTRACT OF THE DISCLOSURE

The invention is a network for determining magnitude and phase angle of the noise impedance of a circuit. A signal generator and an impedance magnitude circuit are respectively coupled across one of the circuit lines to be tested. A phase detector is connected between the signal generator and the impedance magnitude circuit and a limiter means is connected between the impedance magnitude circuit and the phase detector for clipping the signal output from the impedance magnitude circuit to a level substantially equal to the signal level received by the phase detector from the signal generator. The signal phase detector includes a time difference circuit and a lead-lag indicator connected thereacross. The lead-lag indicator includes a pulse forming circuit means, an adding circuit means and a clipping means which cooperate with one another to indicate the direction of the phase difference.

---

The invention described herein may be manufactured and used by or for the Government of the United States of America for governmental purposes without the payment of any royalties thereon or therefor.

The present invention relates to a network and method for measuring noise impedance of a circuit and more particularly to a network and method for accurately measuring the magnitude and phase angle of the impedance without breaking any of the circuit lines.

Any electronics installation that includes radio equipment is concerned with the conducted radio frequency interference (RFI) of each piece of electrical equipment that is placed on the line. Normally each piece of new equipment such as an electrical motor, transmitter, etc. must meet a RFI acceptance test which specifies that the RFI be below a certain amount.

The usual method for making conducted interference measurements is to insert a line impedance stabilization network (LISN) into the line and block out the load impedance with a known impedance for the noise source to work on. See FIG. 1 for such a network which is inserted between the circuit under test and the load. For illustration purposes the circuit under test is shown in FIG. 1 by an equivalent noise-source impedance Zs and an equivalent noise-source voltage Vs and the load is represented by an equivalent load impedance Zl.

The noise voltage V'n is then measured across the resistor R of the LISN with a noise meter (not shown). It is to be noted that unless the load impedance Zl happens to be equal to the resistance R that the voltage reading V'n will be erroneous. This is due to the loading effect of the line by the LISN itself. The result is that the measured voltage V'n gives no indication as to what voltage would appear on the line with the LISN removed. In addition the use of the LISN requires the line to be broken when the LISN is coupled to the line. This not only causes much inconvenience but also breaks the continuity of the line itself.

The present invention provides a method and device which enables the noise impedance of a particular circuit or the load to be accurately measured without breaking the line of the circuit. This may be accomplished by inductively inducing an input voltage into the line, inductively receiving an output voltage on the line due to the input voltage, comparing the input voltage with the output voltage to determine the magnitude of the noise impedance and comparing the phase angle difference between the input and output voltages to determine the phase angle of the noise impedance.

The present invention provides two embodiments. One embodiment (FIG. 2) measures input and output noise voltages so that the impedance can be calculated and further measures the time difference between these voltages for a phase angle calculation. The other embodiment (FIG. 3) provides a direct readout of the magnitude and phase angle of the noise impedance without any calculations whatsoever.

An object of the present invention is to provide a network and method which will enable noise impedance of a circuit to be more accurately determined than that possible with the LISN.

Another object is to provide a network which will enable noise impedance of a closed loop circuit to be accurately determined without breaking the circuit lines.

A further object is to provide a network which will simultaneously indicate the magnitude and phase of noise impedance of a closed loop circuit.

Still another object is to provide a network which provides a simultaneous direct readout of magnitude and phase angle of the noise impedance of a circuit.

Other objects and many of the attendant advantages of the present invention will become readily apparent by reference to the following description and drawings wherein:

FIGURE 1 is a schematic block diagram of a prior art LISN coupled to a circuit to be tested;

FIG. 2 is a schematic block diagram of one embodiment of the invention which is coupled to the circuit to be tested;

FIG. 3 is a schematic block diagram of another embodiment of the invention which is coupled to the circuit to be tested; and FIGS. 4, 5, and 6 are waveforms of the signals in the phase detector of the embodiment shown in FIG. 3.

Referring now to the drawings wherein like reference numerals designate like or similar components throughout the several views there is shown in FIG. 2 one embodiment of the invention. This embodiment is a network which is coupled to a line 10 of a circuit to be tested. As shown in the drawing the circuit to be tested has a conducted line impedance Z of a phase angle θ.

The network includes a signal generator 12 which is connected to a clamp-on type of probe 14. The signal generator 12 is capable of generating a continuous wave voltage $V_1$ and is well known in the art. The clamp-on probe is a radio frequency probe which is capable of being inductively coupled to the circuit line 10 without breaking the line. The probe clamp may take many well known forms such as a circle having a portion which snaps open and closed to enable encirclement of the circuit line. This type of probe enables the signal generator 12 to be coupled to the circuit line without breaking the line.

The network further includes a radio frequency interference (RFI) or noise meter 22 which is capable of reading the noise current $I_n$ on the circuit line. The noise meter is connected to another clamp-on probe 16 which may be identical to the above mentioned probe 14. An alternating current source of power (not shown) may be connected to the signal generator 12 and the noise meter for their operation.

An adjustable delay line 18 is connected to a step attenuator 20 and both the delay line and the attenuator are connected in series with the signal generator 12 and the noise meter 22 across the circuit to be tested. The output $V_1$ of the signal generator is fed to the delay line and the output $V_3$ of the attenuator is fed to the noise meter 22. An on-off switch 24 may be connected in the signal line between the attenuator and the noise meter for purposes to be described hereinafter. A DC source of power (not shown) may be connected to the delay line 18 and the attenuator 20 for their operation.

The noise meter 22 may be connected directly to the signal generator 12 by line 26 with an on-off switch 28 connected therein. This direct connection along with the switch 28 enables the noise meter to selectively measure the generated signal $V_1$. Both the signal generator 12 and the noise meter may be connected to an appropriate source of power.

The magnitude and phase angle of the impedance of the circuit to be tested may now be determined. The magnitude of the impedance is determined according to the formula $$Z = K\left(\frac{V_1}{V_2} - 1\right)$$

where

Z equals the magnitude of the impedance of the circuit to be tested,
$V_1$ equals the input signal voltage generated by the signal generator 12 on the circuit line 10
$V_2$ equals the signal output on the circuit line 10, and
K is a constant equaling the noise meter 22 impedance which is reflected into the circuit line 10.

$V_1$ may be known for the particular signal generator in use. If $V_1$ is not known it may be easily determined by opening the switch 24, closing the switch 28 and reading $V_1$ on the noise meter 22. $V_2$ is read on the noise meter by opening both switches 24 and 28. Having determined both $V_1$ and $V_2$ the magnitude of the circuit impedance Z may now be calculated according to the above formula.

The phase angle of the impedance of the circuit 10 is determined by finding the time difference $\Delta t$ on the delay according to the formula $$\Delta t = t - t_0$$

where $\Delta t$ equals the time difference on the delay line 18
$t$ equals the time setting on the delay line when the delay line and attenuator are simultaneously adjusted until the noise meter 22 indicates a null and
$t_0$ equals the time setting on the delay line when the impedance Z is replaced by a resistor R of equal magnitude ($R=Z$) and the delay line is readjusted (the attenuator remaining at the adjustment for determing $t$) until the noise meter once again indicates a null.

Once the time difference $\Delta t$ has been determined the phase angle $\theta$ of the impedance Z may be calculated according to the formula $$\theta = \Delta t \, f \, (360°)$$

where $\theta$ equals the phase angle in degrees of the impedance of the circuit to be tested
$t$ equals the time difference described above and
$f$ equals the frequency of the signal generated by the signal generator 12.

If it is desired to determine the noise current $I_n$ of the circuit both switches 24 and 28 are opened, the signal generator is turned off and a reading is made on the noise meter 22. Having found the noise current and the magnitude and phase angle of the impedance the noise voltage $V_n$ may be easily calculated according to the formula $$V_n = I_n Z$$

The noise voltage $V_n$ across either a particular circuit or the load on that circuit may be determined by shorting out the circuitry not desired with a capacitor and then conducting the readings described above. If neither the particular circuit or the load is shorted out then the readings enable $V_n$ to be calculated for the combination of noise voltages across the particular circuit and the load.

The network shown in FIG. 2 is especially adaptable for measuring the impedance values of a circuit throughout the frequency range of 2 to 30 megacycles. Below 2 mc. the delay line may become too large for economy purposes. For frequencies below 2 mc. the other network shown in FIG. 3 is especially adaptable and offers the advantage that the impedance values can be read out directly without the necessity of any calculations.

The network shown in FIG. 3 includes the signal generator 12 and may include the noise meter 22. The noise meter in this embodiment is used only to determine the noise current $I_n$. In the same manner as described for the other network (in FIG. 2) the signal generator 12 and the noise meter 22 may be inductively coupled by the clamp-on current probes 14 and 16 respectively to the line 10. An AC power source may drive the signal generator 12 and the noise meter 22 and the remainder of the components in the network may be powered by a suitable DC power source.

The network of FIG. 3 includes an impedance magnitude circuit 30 which may be connected in parallel with the noise meter 22 by the lead shown and may be inductively coupled to the circuit line 10 by the probe 16. Connected between the impedance magnitude circuit 30 and the signal generator 12 is a phase detector 32 which is also inductively coupled to the circuit line 10 by the probe 14. The output of each of the signal generator 12 and the impedance magnitude detector 30 form the inputs to the phase detector 32. Accordingly, the phase detector 32 and the impedance magnitude circuit 30 are connected across the circuit to be tested and they receive the generated input signal $V_1$ and the output signal $V_2$ respectively. The impedance magnitude circuit may include a step attenuator 34 which initially receives the output signal $V_2$ for purposes to be described hereinafter.

The function of the impedance magnitude circuit 30 is to compare $V_1$ with $V_2$ and indicate impedance magnitude Z according to the formula $$Z = A\frac{V_1}{V_2}$$

where

A equals a constant dependent upon the turns ratio of the probes.

Since $V_1$ is generally predetermined and known Z may be determined by the formula $$Z = \frac{K}{V_2}$$

where

K equals $AV_1$

As stated hereinabove the impedance magnitude circuit 30 receives the output signal $V_2$. This signal $V_2$ may be sufficiently amplified by a broad band preamplifier 36 to drive an impedance magnitude detector 38, the detector 38 being connected in the line between the amplifier 36 and the phase detector 32. An adjustable resistor 40 may be connected between the positive terminal of DC power source and the detector 38 for simulating the positive side of the input signal voltage $V_1$ to the detector 38 so that the detector can make the comparison $V_1/V_2$ in the above formula. The resistor is adjusted to simulate not only $V_1$ but also to compensate for the constant A in the above formula and the amplification of the output signal $V_2$ by the amplifier 36. Accordingly, the resistor 40 will be adjusted to a value K' which is equal to K plus the amount required to compensate for the amplification of $V_2$. This is accomplished by substituting a known load for the impedance Z and then the signal generator 12 is adjusted until the meter 42 reads a calibrated impedance based upon the frequency characteristics of the network.

The detector 38 may include a meter 42 which visually indicates the impedance magnitude of the circuit 10. The adjustable step attenuator 34 may be employed to attenuate the output signal $V_2$ thereby changing the range indication of the meter 42. The attenuator may have a predetermined number of stages of resistor-divider networks, each stage being controlled by a four-pole, double-throw toggle switch. When the switch is in the open position the output signal $V_2$ is fed straight through and when the switch is closed the output signal $V_2$ is attenuated a predetermined amount.

The phase detector 3 utilizes the signal input $V_1$ and the signal output $V_2$ to determine the phase angle of the impedance of the circuit to be tested. Since the phase difference between $V_1$ and $V_2$ equals the negative phase angle of the impedance of the circuit the phase detector 32 makes a comparison between the phase angles of $V_1$ and $V_2$.

The phase detector includes a pair of sine wave to square wave converters, each of which may be a Schmitt trigger circuit 44 and 66. The input of the trigger 44 is connected to the signal generator 12 so as to receive the input signal voltage $V_1$ and the input of the trigger 46 is connected to the magnitude detector 30 so as to receive the signal output voltage $V_2$.

A limiter 48 is connected in series between the impedance magnitude circuit 30 and the trigger 46. The limiter holds the magnitude of the signal to the trigger 46 at a value to prevent overloading of the trigger. This level may be substantially equal to the signal input level $V_2$.

Each trigger 44 and 46 converts the sine wave of the voltages to a square wave. Each trigger 44 and 46 has substantially the same characteristics and will have square wave outputs of substantially the same mgnitude. The output of each trigger is connected to the input of a time difference circuit which may be a full wave rectifier diode circuit 50. As shown in FIG. 4 the rectifier compares the square wave outputs of the triggers to obtain a time average difference current which is directly proportional to the phase difference between the sine waves of $V_1$ and $V_2$. This time average current drives a linear scale meter 52. It is to be noted that the rectifier 50 obtains the time average current of only the plus side of the square wave inputs. Accordingly, the meter 50 is calibrated to read 180 degrees full scale.

In order to measure the phase angle of the impedance the phase angle meter 32 must be capable of measuring on a full 360 degree basis. This may be accomplished with a lead-lag indicator 54 which is connected in parallel across the rectifier 50 so as to receive both square wave signals. The lead-lag indicator 54 determines the sign, plus or minus, to indicate whether the signal $V_2$ leads or lags the signal $V_1$. By applying the sign to the reading on the meter 52 the phase angle within the 360° range is indicated.

The lead-lag indicator may include a pulse forming or shaper circuit such as a differentiator and clipper circuit 56 which is connected to the trigger 46 so as to receive the square wave signal $V_2$. The differentiator and clipper circuit 56 first differentiates the square wave $V_2$ (shown in FIG. 5b) to produce the waveform shown in FIG. 5c and then clips the negative pulses of the differentiated wave to produce the waveform shown in FIG. 5d.

The differentiator and clipper circuit 56 and the trigger 46 are connected to an adding circuit 58 so that the square wave $V_1$ and the differentiated and clipped waveform $V_2$ are added to produce a combined signal. When $V_2$ lags $V_1$ the combined signal will look like the waveform entitled "Lag" in FIG. 6 and when $V_2$ leads $V_1$ the combined signal will look like the waveform entitled "Lead."

The output of the adding circuit 58 is connected to a clipper 60 so that the clipper 60 receives one or the other of the combined signals. The clipper 60 is set at the positive level of the undifferentiated signal, namely signal $V_1$. Accordingly, if the output of adding circuit 58 is a lag combined signal the clipper 60 will have a pulse output represented at 62 and if the output of the adding circuit is a lead combined signal the clipper will not have any output. The clipper circuit 60, therefore, has two output states depending on the relative phase of the two inputs $V_1$ and $V_2$.

The output of the clipper 60 is connected to a monostable multivibrator 64 so that the multivibrator is driven according to the output state of the clipper 60. The multivibrator in turn may be connected to two panel lights 66 and 68, the panel light 66 indicating a plus when on and the panel light 68 indicating a minus when on. When the light 66 is on the indication is that $V_2$ lags $V_1$ and when light 68 is on the indication is that $V_2$ leads $V_1$. Accordingly, a plus light 66 indicates that the meter 52 shows a plus phase angle and if the minus light 68 is on the indication is that the meter 52 shows a negative phase angle.

It is now readily apparent that both embodiments of the invention shown in FIGS. 2 and 3 will enable the impedance of a circuit to be accurately determined. In addition to the accuracy both networks can be coupled to the circuit to be tested without breaking any of the circuit lines. These networks greatly simplify impedance checks of all types of circuitry.

Obviously many other modifications and variations of the present invention are possible in the light of the above teachings. It is therefore to be understood that within the scope of the appended claims the invention may be practiced otherwise than as specifically described.

I claim:

1. A device for determining the magnitude and phase angle of the noise impedance of a circuit having a circuit line comprising:

a signal generator for generating a continuous wave input signal;

an impedance magnitude circuit;

means for respectively coupling the signal generator and impedance magnitude circuit to said circuit line to be tested;

a phase detector connected between the signal generator and the impedance magnitude circuit so as to be capable of receiving the generated signal input and a signal output from the circuit line; and said signal phase detector including:

a time difference circuit for measuring the phase angle between the generated input signal and the output signal on the circuit line in a range of 0–180°;

a lead-lag indicator connected in parallel across the time difference circuit for indicating the sign of said phase angle;

a pair of sine wave to square wave converters, the input of one converter receiving the input signal voltage, the input of the other converter receiving the output signal voltage and the output of each converter being connected to the time difference circuit; and said lead-lag indicator including:

a pulse forming circuit means receiving one of the square wave signals for differentiating the one signal and clipping the negative pulses of the differentiated signal;

adding circuit means receiving the differentiated clipped signal and the other square wave signal for adding the two signals to obtain a combined signal;

clipping means connected to the adding circuit for receiving and clipping the combined signal at the level of the other square wave signal so that the clipping means has an output when the differentiated clipped square wave is added to the positive side of the other square wave and no output when added to the negative side of said other square wave; and means including a monostable multivibrator connected to the clipping means for receiving the clipped combined signal and indicating whether or not a pulse is received from the clipping means.

2. A device for determining the magnitude and phase angle of the noise impedance of a circuit having a circuit line comprising:

a signal generator for generating a continuous wave input signal;

an impedance magnitude circuit;

means for respectively coupling the signal generator and impedance magnitude circuit to said circuit line to be tested;

a phase detector connected between the signal generator and the impedance magnitude circuit so as to be capable of receiving the generated signal input and a signal output on the circuit line;

means connected in series between the impedance magnitude circuit and the phase detector for clipping said signal output to the phase detector to a level substantially equal to the signal input level received by said phase detector;

said signal phase detector including:

a time difference circuit for measuring the phase angle between the generated input signal and the output signal on the circuit line in a range of 0–180°;

a lead-lag indicator connected in parallel across the time difference circuit for indicating the sign of said phase angle;

said lead-lag indicator including:

a pulse forming circuit means receiving one of the square wave signals for differentiating the one signal and clipping the negative pulses of the differentiatiated signal;

adding circuit means receiving the differentiated clipped signal and the other square wave signal for adding the two signals to obtain a combined signal; and clipping means connected to adding circuit for receiving and clipping the combined signal at the level of the other square wave signal so that the clipping means has an output when the differentiated clipped square wave is added to the positive side of the other square wave and no output when added to the negative side of said other square wave.

References Cited

UNITED STATES PATENTS

| | | | |
|---|---|---|---|
| 1,684,403 | 9/1928 | Mason | 324—57 |
| 2,198,371 | 4/1940 | Wolferz et al. | 324—127 |
| 2,214,130 | 9/1940 | Green et al. | 324—57 |
| 2,358,462 | 9/1944 | Mahren | 324—61 |
| 2,408,858 | 10/1946 | Keizer | 324—57 X |
| 2,618,686 | 11/1952 | DeLange | 324—57 |
| 2,622,127 | 12/1952 | Alsberg et al. | 324—57 |
| 2,820,195 | 1/1958 | Meyers | 324—57 |
| 2,933,682 | 4/1960 | Moulton et al. | 324—82 X |
| 2,963,648 | 12/1960 | Baskin et al. | 324—83 |
| 2,970,258 | 1/1961 | Sinclair | 324—57 |
| 1,752,579 | 4/1930 | Shea | 337—75 XR |
| 2,777,114 | 1/1957 | Lowe | 324—57 |

FOREIGN PATENTS 150,928 1/1962 U.S.S.R.

OTHER REFERENCES

Yu: Electronics, "How to Measure Phase at High Frequencies," Mar. 17, 1961, pp. 54–56.

RUDOLPH V. ROLINEC, *Primary Examiner.*

E. E. KUBASIEWICZ, *Assistant Examiner.*